United States Patent
Rowe et al.

[19]

[11] Patent Number: 5,887,419
[45] Date of Patent: Mar. 30, 1999

[54] CONTROL SYSTEM FOR A DUCTED FAN GAS TURBINE ENGINE

[75] Inventors: Arthur L Rowe, Littleover, England; Nikolaus Kurz, Berlin, Germany

[73] Assignee: Rolls-Royce plc, London, England

[21] Appl. No.: 961,184

[22] Filed: Oct. 30, 1997

[30]     Foreign Application Priority Data

Nov. 20, 1996 [GB] United Kingdom ................... 9624070

[51] Int. Cl.[6] ............................... F02C 9/00; F02K 3/04
[52] U.S. Cl. ............................................... 60/223; 60/243
[58] Field of Search .................. 60/39.091, 223, 60/240, 243, 226.1

[56]             References Cited
          U.S. PATENT DOCUMENTS 4,959,955  10/1990  Patterson et al. ......................... 60/223

5,622,045  4/1997  Weimer et al. ........................... 60/223

FOREIGN PATENT DOCUMENTS 0696678  2/1996  European Pat. Off. .

*Primary Examiner*—Louis J. Casaregola
*Attorney, Agent, or Firm*—W. Warren Taltavull; Farkas & ManelliPLLC

[57]              ABSTRACT

If the fan of a ducted fan gas turbine engine is damaged, the power output of the engine may not be sufficient for a given throttle setting. The present invention provides a control system which detects fan damage and ensures that there is sufficient fuel flow to the engine to ensure that the overall engine power output is consistent with that commanded by the throttle setting.

7 Claims, 2 Drawing Sheets

CONTROL SYSTEM FOR A DUCTED FAN GAS TURBINE ENGINE

This invention relates to a control system for a ducted fan gas turbine engine. It is particularly concerned with a control system which functions in such a manner that if the fan of the gas turbine engine should suffer a certain degree of damage during operation, the engine continues to develop sufficient propulsive thrust to ensure its effective operation.

Ducted fan gas turbine engines typically comprise a core engine which drives a propulsive fan mounted at the front of the engine. The fan is inevitably prone to damage by foreign objects which are ingested by the engine. A great variety of foreign objects are capable of causing significant fan damage but birds make up the most common group.

In the event of the fan being damaged, it is highly likely that its performance will be affected to the extent the propulsive thrust of the engine will fall. This may be as a result of the fan not functioning with same degree of efficiency as it did in its undamaged state. Additionally if the gas turbine engine in question is provided with a booster compressor positioned between the fan and the remainder of the core engine, the operation of that booster compressor may be adversely affected. Thus, fan damage could result in the shaft driving the booster compressor speeding up and this in turn could cause the booster compressor to surge and consequently cease operating efficiently.

While a certain degree of thrust loss may be tolerable, limits are conventionally established for what is deemed to be acceptable. If the engine is not capable of providing what is looked upon as a safe minimum level of propulsive thrust for a given throttle setting, following fan damage, it is unlikely to be certifiable by the relevant regulatory authorities as being safe for normal operation.

It is an object of the present invention to provide a control system which ensures that the engine continues to operate and provide an acceptable level of propulsive thrust in the event of a certain amount of damage occurring to its fan.

According to the present invention, a control system for a gas turbine engine including a ducted fan, combustion equipment and a turbine driving that fan comprises means to monitor a parameter representative of the power output of said fan, means to monitor a parameter representative of the power output of said turbine, means to compare said monitored parameters and provide an output signal in the event of any deviation of the relationship between said monitored parameters from a pre-determined relationship which relationship is consistent with the normal operation of said fan in an undamaged state, and means responsive to said output signal to change at least one performance-determining characteristic of said engine to cause said engine to maintain an overall power output which is greater than a pre-determined value.

Preferably said parameter representative of the power output of said fan is derived from the rotational speed of said fan and the total engine inlet temperature of said engine.

Preferably said parameter representative of the power output of said turbine is derived from the magnitude of the gas pressure within said combustion equipment and the inlet temperature of said turbine driving said fan.

Said parameter representative of the power output of said turbine is preferably where P30 is the gas pressure within said combustion equipment and TGT is the inlet temperature of said turbine driving said fan.

Said engine performance-determining characteristic which is changed may be the fuel flow to said engine.

Alternatively or additionally, said engine may be provided with a booster compressor which is driven by said turbine, said performance-determining characteristic changed by said control system is preferably the outlet pressure of said booster compressor.

The outlet pressure of said booster compressor may be changed by said control system causing at least one bleed valve downstream of said booster compressor to open.

The present invention will now be described, by way of example, with reference to the accompanying drawings in which.

Figure 1:
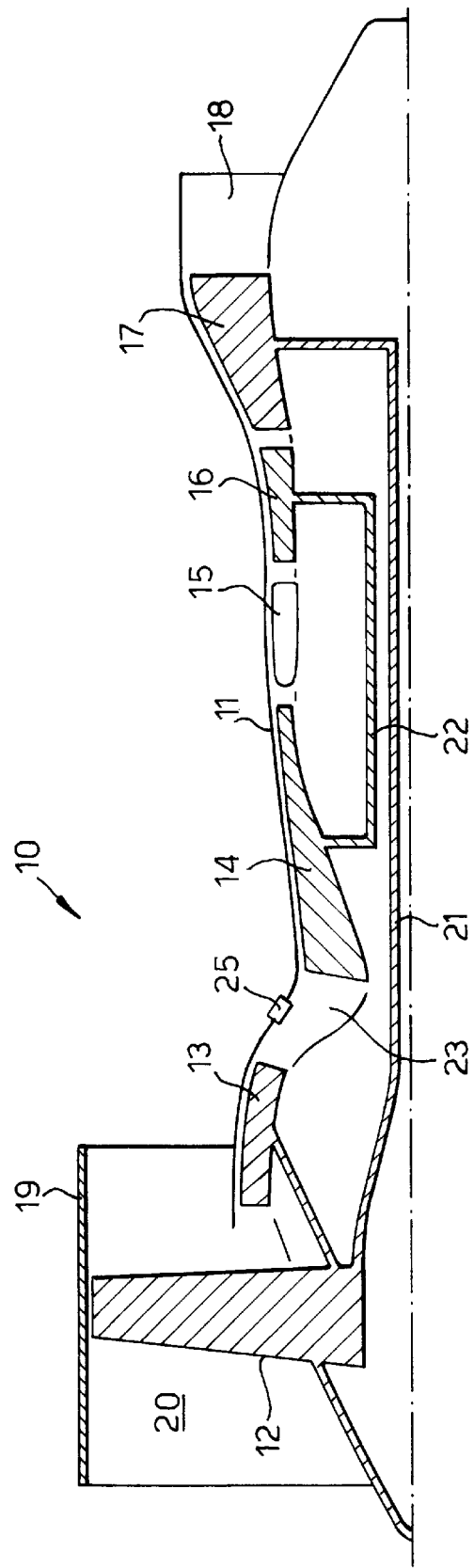
FIG. 1 is a schematic sectioned side view of the upper half of a ducted fan gas turbine engine having a control system in accordance with the present invention.

Referring to FIG. 1, a ducted fan gas turbine engine generally indicated at 10 comprises a core engine 11 which drives a propulsive fan 12. The core engine 11 comprises, in axial flow series, a booster compressor 13, a high pressure compressor 14, combustion equipment 15, a high pressure turbine 16 a low pressure turbine 17 and an exhaust nozzle 18.

The fan 12 is surrounded by an annular casing 19 so that it is located within a duct 20 defined by the casing 19. The fan 12 is driven by the low pressure turbine 17 via a first hollow shaft 21 that extends longitudinally of the engine 10. The first shaft 21 additionally drives the booster compressor 13. A second hollow shaft 22 which is coaxial with and located radially outwardly of the first hollow shaft 21, drivingly interconnects the high pressure compressor 14 and the high pressure turbine 16.

In operation, the fan 12 compresses air which has entered the upstream end of the casing 19 (the left hand end when viewed in FIG. 1). The compressed air exhausted from the fan 12 is divided into two coaxial flows. The outermost flow is exhausted from the engine 10 through the downstream end of the casing 19 to provide the majority of the propulsive thrust of the engine 10. The innermost flow is directed into the booster compressor 13 which serves to raise its pressure. The thus-compressed air is then directed through an annular interconnecting duct 23 to the high pressure compressor 14 where its pressure is raised further. Upon exhausting from the high pressure compressor 14, the compressed air is mixed with fuel and the mixture is combusted in the combustion equipment 15. The resultant hot combustion products then expand through, and thereby drive, the high and low pressure turbines 16 and 17 respectively before being exhausted to atmosphere through the exhaust nozzle 18.

When the engine 10 is in operation powering an aircraft, there is a remote possibility that the fan 12 could be damaged by a foreign object which has been ingested by the engine 10. Typically, that foreign object would be a bird. Although the fan 12 is extremely robust, it could be damaged to such an extent that, for a given throttle setting, it no longer provides sufficient thrust to power the aircraft in a safe and acceptable manner. A further possible problem arising from such fan 12 damage is that the speed of rotation of the fan 12 will increase. Since the booster compressor 13 is directly connected to the fan 12, this can result in the booster compressor 13 overspeeding to such an extent that it surges. Surging is a particularly undesirable unstable airflow condition in a compressor. It is due to a sudden increase (or decrease) in mass airflow through the compressor without a compensating change in pressure ratio.

Figure 2:
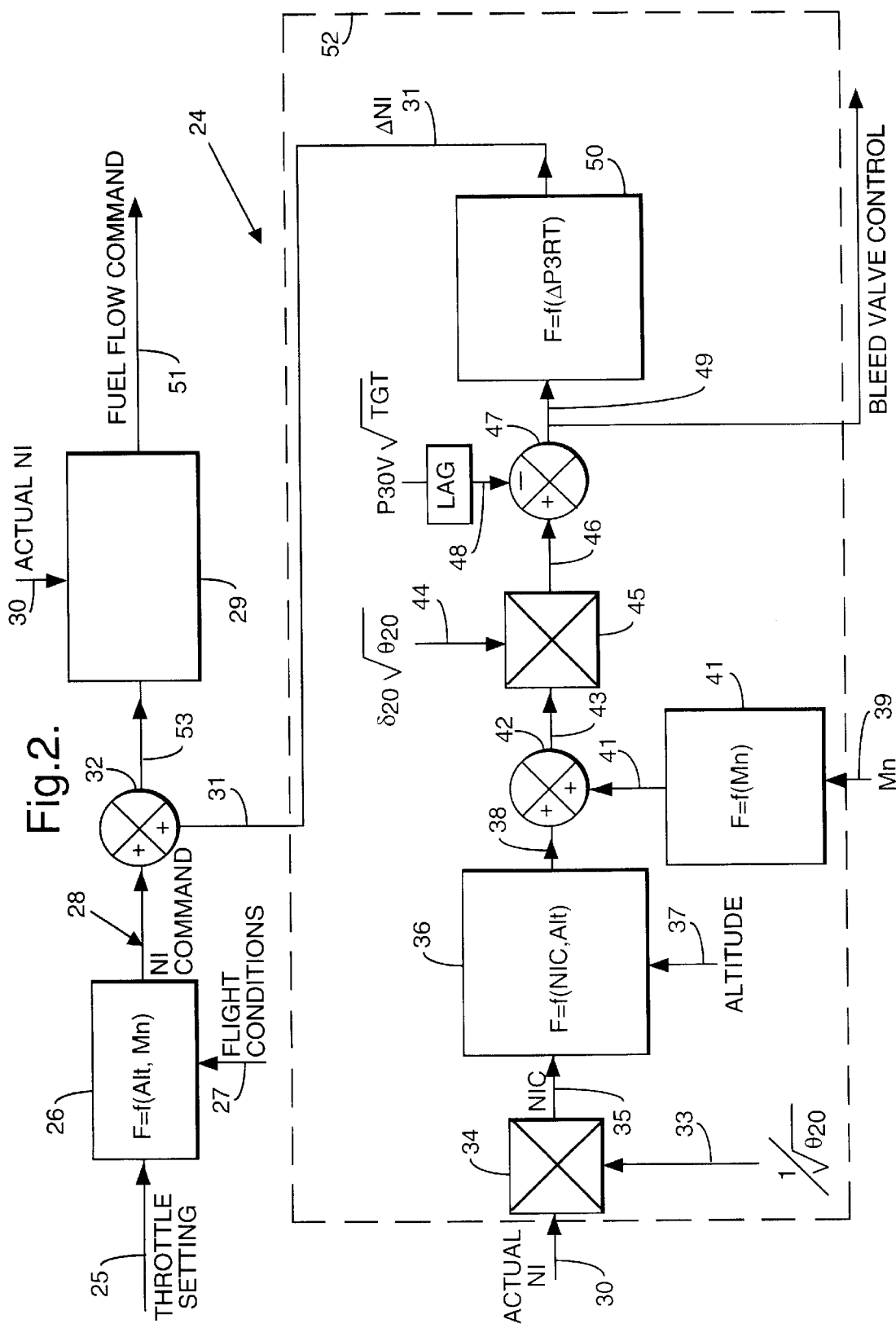
FIG. 2 is a diagram depicting the general layout of the control system of the ducted fan gas turbine engine shown in FIG. 1.

In order to ensure that the gas turbine engine 10 continues to function in an acceptable manner following such damage to its fan 12, it is controlled by a control system in accordance with the present invention which is generally indicated at 24 in FIG. 2. Essentially, the control system 24 functions by monitoring certain engine operating parameters of the core engine 11 and the fan 12 and the relationship between those parameters to provide an indication of whether the fan 12 has been damaged. If, as a result of that comparison, it is clear that the fan 12 has been damaged, the fuel flow to the engine 10 is increased until, for a given throttle setting, the overall power output of the engine 10 is restored to a value that is greater than a pre-determined value.

Alternatively or additionally, the result of this comparison can be used to change another performance-determining characteristic of the engine 10 in order to ensure that its overall power output is restored to a value greater than the pre-determined value. The preferred characteristic is the amount of compressed air which is delivered to the high pressure compressor 14 by the booster compressor 13. This is reduced by opening one or more bleed valves 25 which are provided in the annular interconnecting duct 23 to permit some of the compressed air to escape to atmosphere. As a consequence of this, the pressure ratio across the booster compressor 13 is changed to a value which is consistent with the satisfactory operation of the booster compressor 13 without surging.

It is extremely important that the parameters chosen provide a reliable indication of whether fan 12 damage has occurred. When fan 12 damage does occur, there is relatively little effect upon the performance of the core engine 11. It is desirable, therefore, to detect fan 12 damage by comparing parameters which can be relied upon as providing accurate indications of the performance of the fan 12 and the core engine 11. In accordance with the present invention we have determined that the power outputs of the fan 12 and the low pressure turbine 17 are extremely effective parameters to achieve this end.

At high powers, the power output of the fan 12 correlates very closely with the corrected speed of the fan 12. This is easily derived from the parameters known as N1 and T20 which are respectively the rotational speed of the first shaft 21 and the total inlet temperature of the engine 10. Thus in the present invention we use the parameters N1 and T20 to derive an indication of the power output of the fan 12.

It is, however, more difficult to derive an accurate indication of the power output of the low pressure turbine 17. The power of the low pressure turbine 17 is related to the core mass flow rate, temperature and expansion ratio so that:

(1) Low Pressure Turbine Power = $W44 \times Cp \times \Delta T$
= $W44 \times Cp \times TGT \times \Delta T/T44$ where W44 is the inlet flow of the low pressure turbine 17, Cp is the specific heat at constant temperature $\Delta T$ is the temperature drop across the low pressure turbine 17

TGT is T44 which is the inlet temperature of the low pressure turbine 17

If the high pressure and low pressure turbines are choked (which is nearly true at high power), then $W\sqrt{T}/P$ is fixed at the inlet planes of each of the turbines 16 and 17 where W is flow, T is temperature and P is pressure. Consequently:

(2) $W\sqrt{T/P} = K \Rightarrow W \alpha P\sqrt{T}$ i.e. the enthalpy flux of the low pressure turbine 17 is proportional to $P\sqrt{T}$. Also, the expansion ratio of the high pressure turbine 16 is fixed, and so P44 is proportional to P30 (which is the pressure within the combustor 15). For the same low pressure expansion ratio:

(3) Low Pressure Turbine Power $\alpha$ P44$\sqrt{TGT}$ $\alpha$ P30$\sqrt{TGT}$ (4) Correct Low Pressure Turbine Power $\alpha$ P30$\sqrt{TGT}/\delta_{20}\sqrt{\theta_{20}}$ where $\theta_{20} = \dfrac{\text{Engine inlet temperature}}{288.15}$ and $\delta_{20} = \dfrac{\text{Engine inlet Pressure}}{14.696}$ In normal operation, the expansion ratio of the low pressure turbine 17 is a function of corrected fan speed and Mach number, the same parameters upon which the corrected fan power depends. Allowance for variations in this expansion ratio can therefore be made when these parameters are compared.

(5) P30$\sqrt{TGT}/\delta_{20}\sqrt{\theta_{20}}$=f(N1$\sqrt{\theta_{20}}$, Mach Number)

It will be seen therefore that there is a relationship between the power output of the low pressure turbine 17 expressed as P30$\sqrt{TGT}/\delta_{20}\theta_{20}$ and the power output of the fan 12 expressed as f(N1$\sqrt{\theta_{20}}$, Mach Number. The comparison of fan output power derived as described above and low pressure turbine output power derived as described above, has to take into account that due to its inertia the fan 12 speed (and thus output power) lags behind the low pressure turbine power 17 during non-steady state operation of the engine. This effect can be described with a first order lag, the time constant $\tau$ of which is a function of corrected fan speed and total inlet pressure P20.

Thus the relationship between power output of the low pressure turbine 17 expressed as P30$\sqrt{TGT}/(\delta_{20}\theta_{20})$ and the power output of the fan 12 expressed as f(N1/$\sqrt{\theta_{20}}$, Mach Number) can be established.

(6) LAG(P30$\sqrt{TGT}/(\delta_{20}\theta_{20}),\tau$)=f(N1/$\sqrt{\theta_{20}}$, Mach Number)

Deviations from this relationship imply a change in performance of either the fan 12 or the low pressure turbine 17. Since the performance of the low pressure turbine 17 does not normally deteriorate noticeably, the relationship provides a highly effective way of detecting damage to the fan 12 that is relatively insensitive to changes in the performance of the core engine 11.

Referring in more detail to the control system 24, a signal 25 which is representative of the throttle setting of the engine 10 is directed to a signal processing unit 26. The signal processing unit 26 also receives signals 27 which are representative of the flight conditions experienced by the aircraft which is powered by the engine 10. Specifically, those flight conditions are velocity (expressed as Mach number) and altitude. The unit 26 processes the signals 25 and 27 to provide an output signal 28 called N1 command. The N1 command signal is essentially representative of speed of rotation of the first hollow shaft 21 that would be necessary to achieve an overall power output from the engine 10 consistent with the commanded power output as represented by the throttle setting input signal 25.

Under normal engine operating conditions, the N1 command signal 28 is directed to a unit 29 which is adapted to compare the N1 command signal 28 with a signal 30 which is representative of the actual speed of rotation of the first hollow shaft 21. The unit 29 provides an output signal 51 which determines the fuel flow to the engine 10 so that if the commanded and actual values of N1 do not coincide, the fuel flow to the engine 10 is modulated until coincidence does occur.

If the fan 12 suffers damage as described earlier, the engine 10 may, as a result, fail to provide an overall power output in accordance with that commanded by the throttle setting signal 25 due to an insufficient fuel flow to the engine. In order to make provision for this eventuality, a further signal 31 is added to the N1 command signal 28 by an adding unit 32. Thus the further signal 31 is only added to the N1 command signal 28 in the event of the engine fan 12 incurring damage which results in the overall power output of the engine 10 falling below a pre-determined level for a given throttle setting.

The further signal 31 is generated by a correction circuit generally indicated at 52. The correction circuit 52 receives, as an input, the actual N1 signal 30 representative of the actual speed of rotation of the first hollow shaft 21. That signal 30 is then multiplied by a signal 33 which is representative of $1/\sqrt{\theta_{20}}$ 20 (as defined earlier) by a multiplier 33 to provide an N1 C signal 35 which is representative of the corrected speed of the first hollow shaft 21.

The N1 C signal 35 acted upon by a signal processor 36 which also receives and acts upon a signal 37 representative of aircraft altitude to provide an output signal 38 which is a function of those two parameters. A signal representative of aircraft velocity 39 (expressed as Mach Number Mn) is acted upon by a signal processing unit 40 to provide an output signal 41 which is a function of aircraft velocity. That signal 14 is then added to the output signal 38 by an addition unit 42.

The sum 43 of the two signals 38 and 41 is then multiplied by a signal 44 representative of the expression $\delta_{20}\sqrt{\theta_{20}}$ by a multiplication unit 45. The resultant signal 46 is then directed to an addition/subtraction unit 47 which serves to subtract from the signal 46, a signal 48 which is representative of the expression P30V$\sqrt{TGT}$ and which takes into account lag due to the inertia of the fan 12 lagging behind the output power of the low pressure turbine 17. The resultant signal 49 is then directed to a signal processing unit 50 which acts upon that signal by looking up a table using P30V$\sqrt{TGT}$ to provide an output signal 31 which is representative of $\Delta N1$. $\Delta N1$ is the difference between the actual speed of rotation of the first hollow shaft 21 and the speed of rotation necessary to provide a power output from the engine 10 which is consistent with the engine throttle setting as indicated by the signal 25.

The $\Delta N1$ signal 31 is directed to the adding unit 32 where it is added to the N1 command signal 28. If the $\Delta N1$ signal is zero, as would be the case if the engine 10 was functioning normally, then output signal 53 from the adding unit 32 would be the same as its N1 command input signal 28. However, if the N1 signal 31 is greater than zero, thereby indicating an engine power loss, the adding unit 32 output signal 53 is representative of the N1 command signal 28 plus the further signal 31. Thus under these circumstances, the adding unit output signal 53 is effectively an N1 command signal that has been modified to take into account the disparity between the engine power output commanded by the throttle setting signal 25 and what would be the actual engine power output resulting from that throttle setting signal. Consequently, in the event of engine performance-limiting damage to the fan 12, the fuel flow command output signal 51 from the unit 29 is increased to a level consistent with that of the engine 10 providing an overall power output which is consistent with that normally expected from a given throttle setting.

Alternatively or additionally, the output signal 49, may be used to initiate the operation of the bleed valves 25. Thus in the event of damage to the fan 12 which could result in the booster compressor 13 surging, the bleed valves 25 are opened to alter the pressure ratio across the booster compressor 13 and thereby prevent such surging.

We claim:

1. A control system for a gas turbine engine including a ducted fan, combustion equipment and a turbine driving that fan, comprising means to monitor a parameter representative of the power output of said fan, means to monitor a parameter representative of the power output of said turbine, means to compare said monitored parameters and provide an output signal in the event of any deviation of the relationship between said monitored parameters from a pre-determined relationship which relationship is consistent with the normal operation of said fan in an undamaged state, and means responsive to said output signal to change at least one performance-determining characteristic of said engine to cause said engine to maintain an overall power output which is greater than a pre-determined value.

2. A control system for a gas turbine engine as claimed in claim 1 wherein said parameter representative of the power output of said fan is derived from the rotational speed of said fan and the total engine inlet temperature of said engine.

3. A control system for a gas turbine engine as claimed in claim 1 wherein said parameter representative of the power output of said turbine is derived from the magnitude of the gas pressure within said combustion equipment and the inlet temperature of said turbine driving said fan.

4. A control system for a gas turbine engine as claimed in claim 3 wherein said parameter representative of the power output of said turbine is P30$\sqrt{TGT}$ where P30 is the gas pressure within said combustion equipment and TGT is the inlet temperature of said turbine driving said fan.

5. A control system for a gas turbine engine as claimed in claim 1 wherein said engine performance-determining characteristic which is changed is the fuel flow to said engine.

6. A control system for a gas turbine engine as claimed in claim 1 wherein said engine is provided with a booster compressor which is driven by said turbine, said performance-determining characteristic changed by said control system being the outlet pressure of said booster compressor.

7. A control system for a gas turbine engine as claimed in claim 6 wherein the outlet pressure of said booster compressor is changed by said control system causing at least one bleed valve downstream of said booster compressor to open.

* * * * *